(12) United States Patent
Stine et al.

(10) Patent No.: US 10,268,562 B1
(45) Date of Patent: Apr. 23, 2019

(54) ADVANCED MANUFACTURING INSIGHT SYSTEM FOR SEMICONDUCTOR APPLICATION

(71) Applicant: PDF Solutions, Inc., San Jose, CA (US)

(72) Inventors: Brian Stine, San Jose, CA (US); Richard Burch, San Jose, CA (US); Lijin Zhu, San Jose, CA (US)

(73) Assignee: PDF Solutions, Inc., San Jose, CA (US)

( * ) Notice: Subject to any disclaimer, the term of this patent is extended or adjusted under 35 U.S.C. 154(b) by 15 days.

(21) Appl. No.: 15/469,352

(22) Filed: Mar. 24, 2017

Related U.S. Application Data

(60) Provisional application No. 62/313,082, filed on Mar. 24, 2016.

(51) Int. Cl.
*G06F 17/18* (2006.01)
*G06F 19/00* (2018.01)
*G06F 11/34* (2006.01)
*G06F 11/30* (2006.01)

(52) U.S. Cl.
CPC ...... *G06F 11/3452* (2013.01); *G06F 11/3024* (2013.01)

(58) Field of Classification Search
CPC .................. G06F 11/3452; G06F 11/3024
USPC ............... 702/179, 108, 123; 707/999.102
See application file for complete search history.

(56) References Cited

U.S. PATENT DOCUMENTS

| | | | |
|---|---|---|---|
| 6,865,578 B2 * | 3/2005 | Hays | G06Q 10/10 |
| 2012/0022700 A1 * | 1/2012 | Drees | G05B 15/02 700/276 |

\* cited by examiner

*Primary Examiner* — John H Le
(74) *Attorney, Agent, or Firm* — Pillsbury Winthrop Shaw Pittman LLP

(57) ABSTRACT

Described is a method of reducing multitudes of input data signals to a manageable plurality of input data signals and using the manageable plurality of input data signals to obtain response data that is provided to the semiconductor wafer, packaging, or design facility.

12 Claims, 11 Drawing Sheets

ADVANCED MANUFACTURING INSIGHT SYSTEM FOR SEMICONDUCTOR APPLICATION

RELATED APPLICATIONS

This application relates to and claims priority from U.S. Provisional Application No. 62/313,082 filed Mar. 24, 2016, which is expressly incorporated herein by reference.

BACKGROUND

Various systems and data sources exist within the semiconductor manufacturing sector for various different tasks, and similar systems exist within other manufacturing sectors. Data that is obtained from components that perform these separate tasks is not, however, well integrated. Still further, the sheer volume of data that within the fabrication of integrated circuits is immense, leading to difficulty in determining which data to use and how to affect decisions.

FIG. 1 illustrates a traditional approach for analyzing data. In such an approach, a user might attempt to store all of the data in one large database. Then use an extremely expensive server to grab relevant data and correlate all of the data to the response of interest. This leads to frustrated users because (1) due to the sheer size of the data, correlations are bound to appear either just by pure chance or because even micro-sized impacts get magnified to statistical significant just based on data size (2) the cost in time and equipment of maintaining and developing such a system is immense.

SUMMARY

Described is a method of reducing multitudes of input data signals to a manageable plurality of input data signals and using the manageable plurality of input data signals to obtain response data that is provided to the semiconductor wafer, packaging, or design facility.

In a preferred embodiment, using a computer system and user feedback, the method comprises the steps of: inputting each of the multitudes of input data signals to the computer system; determining which of the multitudes of input data signals are heuristically significant input data signals using the computer system and a grading system that includes heuristical and/or statistical information; further reducing the multitudes of input data signals to the manageable plurality of input data signals using the computer system and the heuristically significant input data signals via the computer system monitoring passive and active user feedback; and using the manageable plurality of input data signals to obtain response data, wherein the input data signals are a subset of machine-readable entry sourced from a semiconductor wafer, packaging, or design facility, and wherein the response data is associated with the semiconductor wafer, packaging, or design facility.

Embodiments are also described that allow the manufacturing insight system to be used in other manufacturing facilities than semiconductor wafer, packaging or design facilities.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein.

DETAILED DESCRIPTION OF THE PREFERRED EMBODIMENTS

Figure 1:
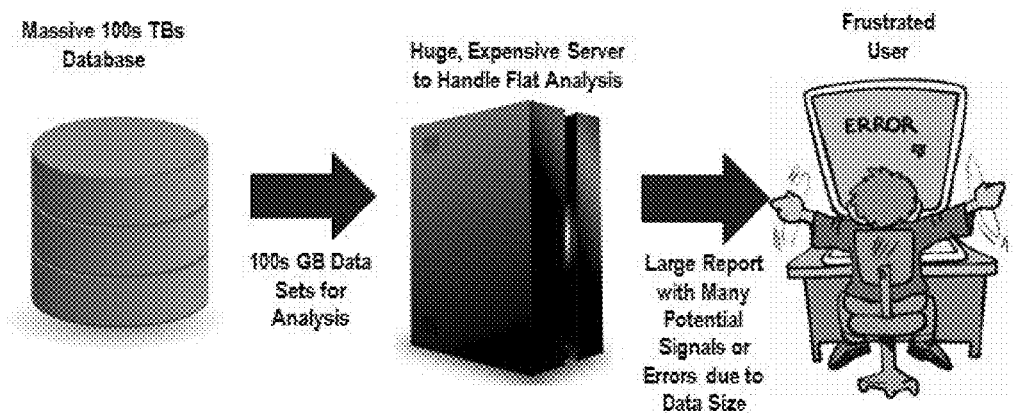
FIG. 1 illustrates a traditional approach for analyzing data.
Figure 2:
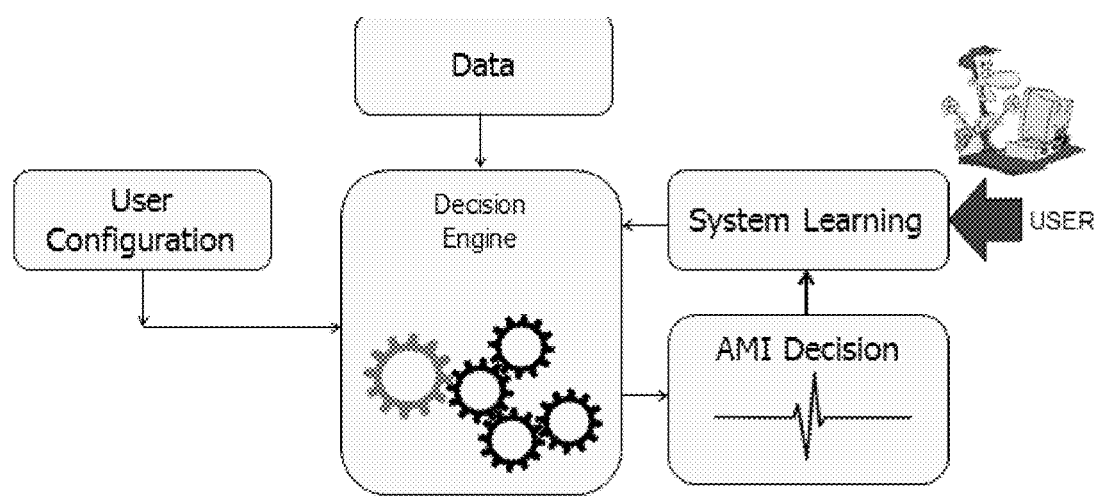
FIG. 2 illustrates an overview of a preferred implementation of the manufacturing insight system.

FIG. 2 illustrates an overview of a preferred implementation of the manufacturing insight system. The manufacturing insight system is implemented as a computer network that includes various processors, memories, applications and the like. The core of the manufacturing insight system is a decision engine, implemented in one embodiment from application programming that provides the functions described herein and which is then executed by the processors referred to above, and which is stored in the memories referred to above.

This engine takes data as input and learning and outputs a decision based upon configuration. The embodied learning is either direct from the user or passive as described below.

The resulting decision is a conclusion based upon the data identifying a particular root cause or correlation between a response and an input which is under control of the user.

Decision Engine

As noted above, the sheer volume of data within the fabrication of integrated circuits is immense. Thus a brute force correlation between the data and responses will invariably result in a statistically significant correlation either just by pure chance or because some very-micro effect gets magnified to significance just through data volume. The end result is thousands of signals—many of which are likely false or uninteresting. A statistical approach alone is insufficient.

Figure 3:
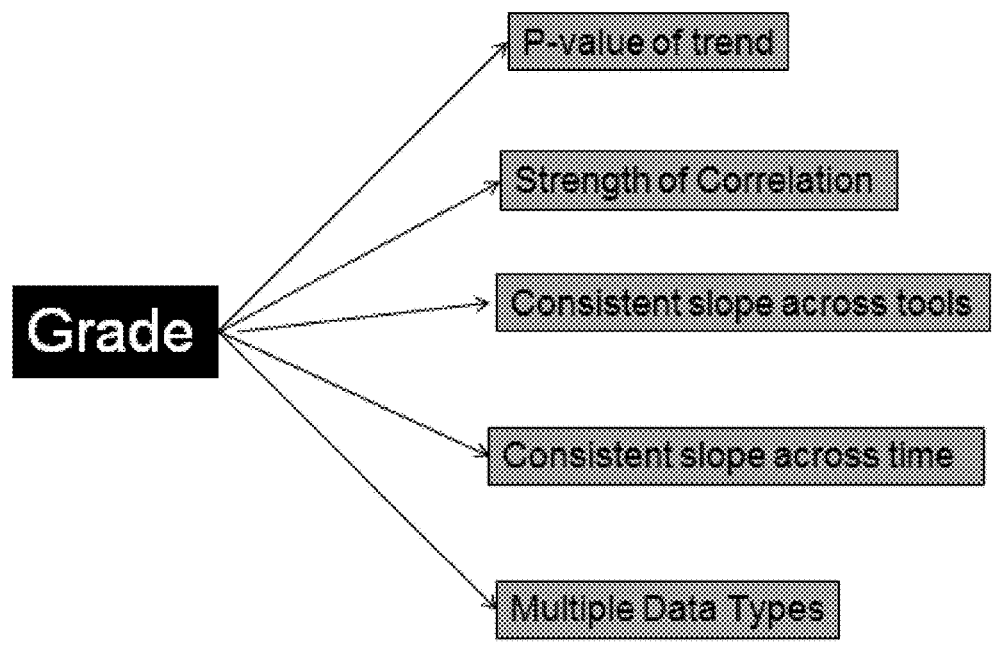
FIG. 3 illustrates co-mingling measures into a single grade.

A heuristical grading system to overcome such limitations is one critical component of the decision engine. It allows the ability to "grade" a correlation or relationship between a response and an input. The grading takes multiple measures of the strength of a signal to report back a single number called "grade" which ranges from 0 to 1. A grade near zero represent a signal which is most likely noise or false. A grade near one represents a signal which is more likely to be true. An example of how to co-mingle measures into a single grade is shown in FIG. 3. Note, however, that this is an example and not the only way to map multiple measures into a single grade. In this example, five factors make up the grade. The first factor represents the statistical significance of any correlation seen. Numbers near zero are statistically significant and numbers near one are random.

"Strength of the correlation" represents the "slope" of any relationship between a response and an input. If the "slope" is very steep, we want a higher grade but id the "slope" is very weak compared to other inputs, we want a lower grade. This factor prevents any signal, which albeit strong, from scoring a high grade if it's relative impact to the response is small.

"Consistent slope across tools" means the signal is checked not only across all of the data but across each individual equipment associated with the input. For example, if the response is yield and the input is critical dimension after metal-1 lithography, the decision engine will check the same correlation across each and every lithography tool. If the sign of the "slope" of each correlation is the same across all tools, then the grade should move higher due to consistency. However, if the "slope" is positive overall but varies from negative to positive based on each tool, the grade should be scored lower because of inconsistency.

"Consistent slope across time" is similar. The data is divided into three or four non-overlapping time regions. The "slope" of the correlation between the response and the input is computed in each time region. If the "slope" overall is positive then the grade should be high because of consistence. However if the "slope" in each time zone is random between positive and negative, the grade should score lower.

"Multiple Data Types" means to look at the same input across multiple responses. For example, the user might have yield, defect counts after inspection, monitor wafer defect counts, etc as responses that she/he cares about. If a strong correlation is seen between each of these responses and the input and the slope of the correlations makes physical sense (e.g. if yield is positively correlated with the input and defect count is also positively correlated, this is a nonsensical signal since higher yield is not consistent with higher defect counts) then a higher grade is warranted. If the correlation is strong for only one response, a lower grade is warranted.

In the above "slope" is meant in a generalized sense and not specific. That is, we might choose a simple linear model between the response and the input in which cause "slope" truly is the slope of the line. On the other hand, we might chose a non-linear or polynomial model in which case "slope" should be generalized to represent the derivative of the relationship or non-parametric equivalent if the inputs are non-numeric.

A specific way to map each of the "tests" or components of the grade into a single grade number is needed. This could either be a weighted, scaled linear combination or other more complicated combination. Furthermore, there may be more than five "tests" for grade although they cannot be completely numerated within.

System Learning

Heuristic grading alone is not enough to guarantee the signals of the decision engine with high grade will be true or not. Another key component of the system is machine learning or system learning. Two types of learning are critical for the system: passive and active learning.

Passive learning is learning fed to the decision engine based upon the usage patterns of the user. If the user is frequently looking or analyzing data coming from a particular input then it is natural to expect that this input must be critical to the user. As such any signals which are detected by the decision engine involving this signal should be given a slightly adjusted, higher grade. This is positive reinforcement. On the other hand, signals involving inputs which are seldom or never analyzed or looked at by the user are graded downward by the decision engine. This is negative learning.

Active learning is learning directly from the user. When the decision engine finds a potential signal, it is displayed to the user. The user is then given the opportunity to comment on the signal. For example, they might vote the signal a "false alarm" or they might vote the signal "likely true" or they might vote the signal "possible but need more confidence" or other votes. If the user has voted a signal as "likely true", the decision engine will uplift the grade now and in the future for this signal. This is positive reinforcement. On the other hand, if the user has voted a signal as a likely "false alarm", the decision engine will downgrade the grade now and in the future for this signal. This is negative learning.

The relationship between the "learned" grade and the "numerically computed" grade is affected via a transformation such as $G=I(g)$ where g is the "numerically computed" grade and G is the learned grade and I is the weighting function which appropriately levels between seen positive reinforcement and negative learning.

In addition, the learning may and is often (1) asymmetrically assigned (2) implements cool-down periods and (3) slightly volatile.

Asymmetrical assignment means that positive reinforcement acts upon a grade steeper than negative learning. This is because an engineer is busy and has many competing tasks. For him or her to label a signal as probably true overcomes a great deal of possible internal resistance to labeling signals and outside influences for him or her taking action. Thus, the system sweeps up positive reinforcement fast. On the other hand, an engineer may have many poor reasons for pushing a signal as a "false alarm". For example, the user may be busy or because the signal doesn't meet his or her understanding of the physics involved, she or he will just give the signal the thumbs down. It is anecdotal that many true signals seen in our experience have been often ridiculed by engineers and it took several persistence attempts to convince them before taking action. Thus, we should be slow to react (but not ignorant of) "false alarms" compared to "probably true" signals.

Cool down periods represent the tendency of users to express frustration when using systems. If a user sees a signal which she or he thinks is ridiculously false, he or she might click the button for "false alarm" many times in rapid succession just to vent frustration. As such, the system records the intention of a "false alarm" but not the multiple, rapid presses. Multiple presses of "false alarm" spread over long periods of time is very different and graded strongly negative much less so than multiple, rapid presses of "false alarm".

Volatile learning represents the tendency of user's judgement to fade with time. If a user pressed "false alarm" a year ago but has not pressed it since then, the system should tend to only very weakly scale down the grade as opposed to the case of when a user pressed the "false alarm" button routinely over the past few months. To implement this, the system which slightly scale back learning that become stale and is not consistently reinforced. Similarly, if some users are frequently clicking "false alarm" while others are clicking "probably true", the system recognizes this accordingly as less grade affective as opposed to a consistent clicking of learning by multiple users.

Figure 4:
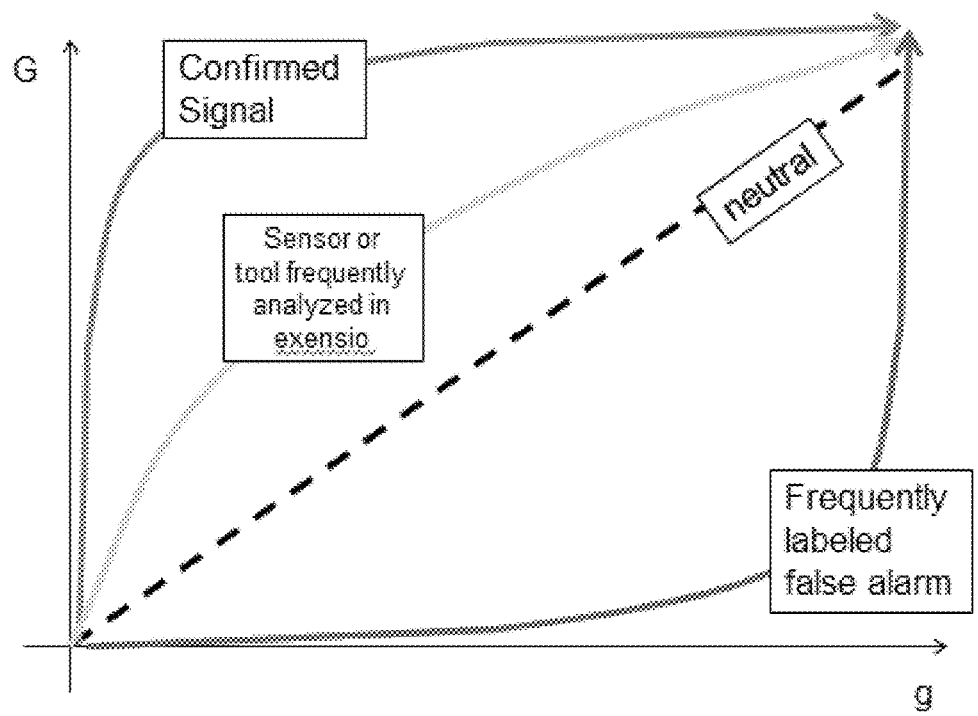
FIG. 4 illustrates various weighting function features that can be implemented by the manufacturing insight system.

The weighting function which implements the above is case specific. Some might choose a linear weighting while others might choose a more non-linear weighting of user input. In any case, the above grade scales are applied. FIG. 4 illustrates some of the salient features mentioned above.

User Configuration

As implied by the above, the calculation of grade and grade affect from learning implies configuration. There are many ways to combine and scale individual tests into a single and grade. Also, many possible mapping functions between g and G. Finally, user preferences will exist. Thus, the system has some user configuration. This configuration may or may not be security controlled (as we might not want any user modifying learning functions resulting in a chaotic system).

Parallelization

With all of the calculations imposed by this system, the computational demands become significant for all but the simplest implementation. In order to execute efficiently, parallelization should be employed. Fortunately, this system lends easily to parallelization. For example, grade calculation requires executing many "tests". For the most past, these "tests" can be implemented independently of each other. In this way, the system can be implemented using parallel computation. Furthermore, it is often the case that you want to implement the system for distinct products or distinct process modules (lithography vs CMP vs etch). Thus, parallel computing is a natural extension.

System Modules

Figure 5:
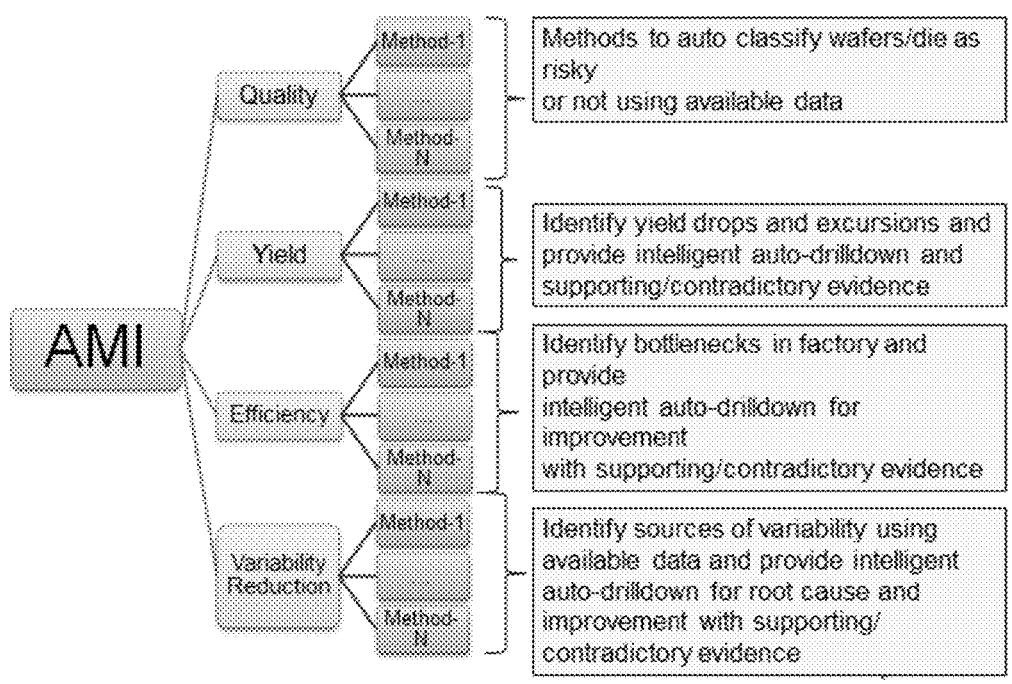
FIG. 5 illustrates quality, yield, efficiency and variable reduction modules that can be used in one preferred embodiment of the manufacturing insight system.

A preferred implementation of the system uses various modules, each of which are capable of doing dedicated tasks, as described herein, within the context of semiconductor manufacturing. Four of these modules, with their themes, are shown in FIG. 5, as well as a brief description of their purpose. These modules are described below based upon the requirement. These four modules are not the only possible instantiation of the system, as additional themes can be included, and in addition a mix and match of themes can each be implemented.

Yield

Figure 6:
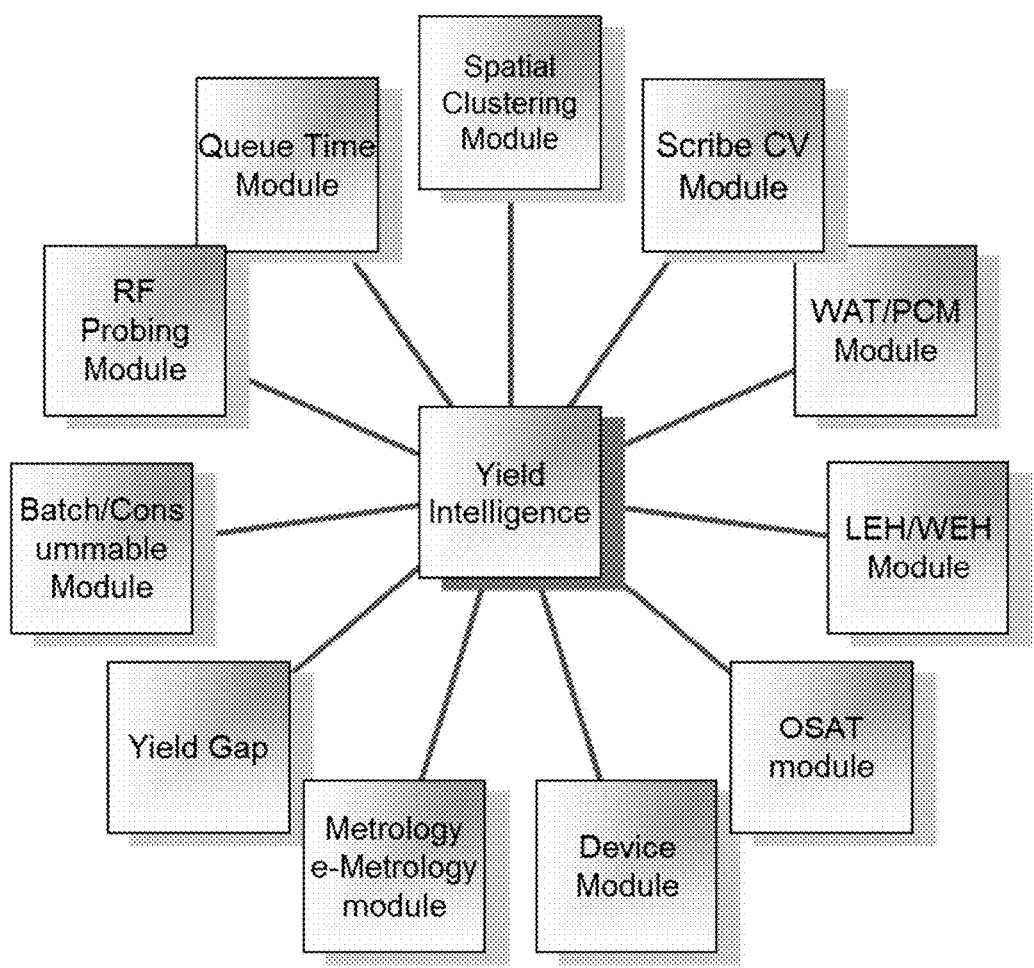
FIG. 6 illustrates the yield module and modules associated therewith.

The yield module, which provides yield intelligence, is shown as a center module in FIG. 6, and:

Automatically detects if there is a yield decrease or increase or increase/decrease in outliers.

Automatically Identifies which fab(s) product(s) are affected and which bin(s) are affected (quality)

The surrounding modules identify root causes of such increase/decrease, based upon the particular data input and required for the yield requirement.

In particular, drill-downs to correlations are made, which allows for the first pass root cause analysis that is performed (based on the requirement).

Monitoring by product and by foundry can thus be achieved.

The modules surrounding the yield module are now described:

The Spatial Clustering Module identifies if root cause of yield drop/rise is localized to a specific spatial pattern on a wafer. It automatically identifies if an outlier change is related to a specific spatial pattern. Identify if pattern is new or previously seen.

The Scribe CV module identifies automatically which Scribe CV parameters correlate to yield/outlier drop/rise. Rule-out spurious correlations. Prevent contamination from cross-correlated signals. It also identifies which module excursion is located in. Inloine and sort analysis are preferably used.

The WAT/PCM module identifies automatically which PCM parameters correlate to yield/outlier drop/rise. It also Rules-out spurious correlations. Also, it prevents contamination from cross-correlated signals.

The LEH/WEH module identifies automatically if any change in equipment/chamber usage is correlated to yield drop/rise or excursion rate drop/rise. It automatically detects if equipment usage change in time is correlated with yield rise/drop. Bad chambers and equipment are identified by conjoined equipment history, defect, PCM/WAT and queue time analysis and auto-drill down.

The OSAT module identifies automatically if any probe card, tester, load-board, or testing facility is root cause of yield rise/drop or excursion rise/drop.

The Device module identifies if device parameters are drifting. Use PCM/WAT and Scribe CV measurements to identify why device is changing (e.g. Lpoly, Cov, Tox, etc.)

The Metrology e-Metrology module uses metrology and e-metrology measurements to automatically identify if yield drop/rise or excursion drop/rise correlates in time with a metrology measurement change in time, The Yield Gap module uses critical area and systematic yield models to automatically identify which products are yielding expectedly vs those which have an undiagnosed systematic.

The Batch/Consummable module use critical area and systematic yield models to automatically identify which products are yielding expectedly vs those which have an undiagnosed systematic.

The RF Probing Module computes automatically stop-on-fail paretos from continue-on-fail testing. It identifies systematic yield loss from probe-card position/repeater. It also automatically helps identify probing related specs.

The Queue Time Module computes queue times of each step automatically and sees if yield drop/rise correlates to changing queue-times. It preferably includes a use process step-ordering to automatically identify which steps have statistically highest chance of causing yield drop.

Root cause analysis can be thus performed, based upon the results of determination of different module. With learning and input from the user (as described above), the system quickly learns how to react quickly to yield loss items detected.

Quality

The quality module is used to judge or grade wafers based upon data. In particular, lots which have high yield and no spatial yield pattern and no known flags during processing would be given a high grade and shipped immediately to the end customer. Lots which have high yield but a spatial cluster might be given a lower grade which results in the wafer being held for engineering. Engineering might then decide to disposition the wafer by inking out near the spatial cluster. Lots which have a low yield or a known flag during processing might be given a very low grade and thus tagged for scrapping.

Thus, a system is provided to set rules for making decisions on lots about whether they should be shipped (NORMAL LOTS) vs held for engineering (ON-HOLD LOTS). Currently, this decision is often made manually by engineering so it is plagued by judgement calls and can easily become a bottleneck to shipping lots (and thus making money for the customer).

Figure 7:
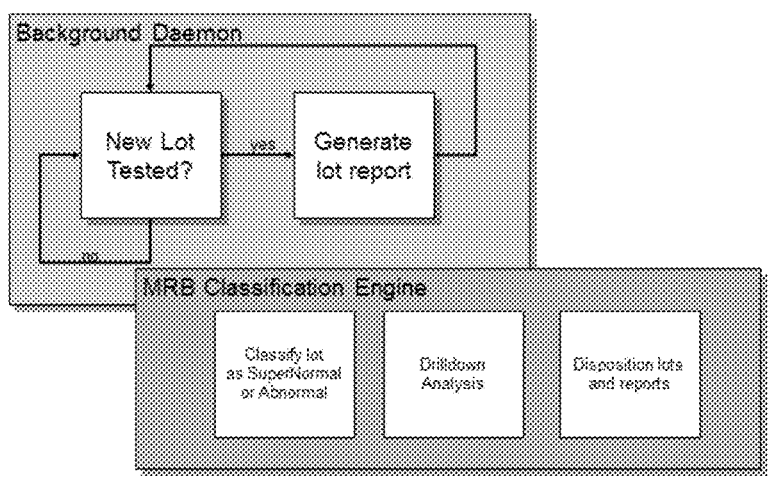
FIG. 7 illustrates modules associated with the manufacturing rule board component of the manufacturing insight system.

There are two parts to the manufacturing rule board (MRB) system as shown in the FIG. 7.

The first part is a background daemon. It is preferably always running in the background in a preferred embodiment. It should look to see when a new lot has finished testing. When it detects this, it automatically makes a report for the lot using a predefined format. The second part is the classification engine. It is either auto-run at a predetermined interval or as-needed by the user. It looks at all lots within a specified time range and based upon rules defined by the user determines whether a lot is normal or abnormal. It allows the user to do some drilldown on those lots. It also dispositions the lots by either moving the lot reports into specified directories, uploading the lot report to a database, and/or setting flags in a production system to indicate the abnormal/normal lot status. Finally, the MRB classification tool also allows the user to define the rules which determine abnormal vs normal lot.

1. Report Builder Daemon

It is assumed that generating acrobat files of standard reports is an existing capability of exensio via webplayer and/or report builder. Thus, this document does not touch this specification.

2. MRB Front End

A. Main Screen

Figure 8:
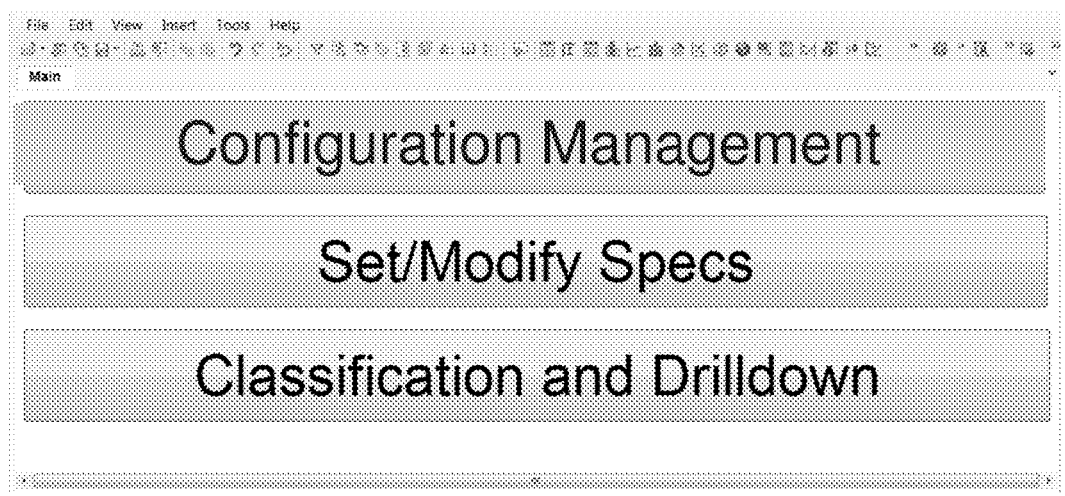
FIG. 8 illustrates a main page associated with the manufacturing rule board component of the manufacturing insight system.

The main screen should preferably show three large buttons which give the user choices to (A) Configuration Management (B) Set/Modify Specs (C) Classification and Drilldown, as illustrated in FIG. 8.

B. Configuration Management

Figures 9, 10:
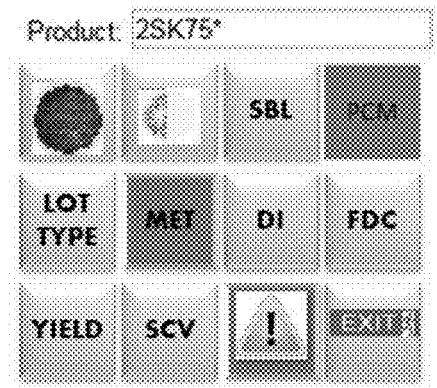
FIG. 9 illustrates a configuration management page associated with the manufacturing rule board component of the manufacturing insight system.
FIG. 10 illustrates a visual mode entry screen associated with the manufacturing rule board component of the manufacturing insight system.

The configuration management page is shown in FIG. 9. This sheet allows the user to define which products should run MRB and how often. Initially, five rows will come up. More rows can be added by clicking the "Add New Product" button. The bottom-most row can be deleted by clicking the "Delete Product" button. Each row specifies the product and how often it will run MRB. NOTE that wildcards are allowed in the product list box. Only allowed wild-card characters are "*" (match anything) and "?" match any one character (similar to old MS-DOS format). The frequency of running is selected in a drop-down box. Options are run daily, hourly, weekly, monthly, every 2, 4, 5, 6, and 12 hours. For daily, weekly, and monthly there should be some environment variable that controls exactly which time (e.g. daily means every day at 08:00, weekly means every Monday at 06:00, monthly means every $5^{th}$ day of the month at 14:00).

By clicking the "Save Run Sheet" button, the information will be stored in a file or a database somewhere. The system is constantly looking at that file or database entry to determine when it should fire off an MRB run.

C. Setting and Entering Specs i. Philosophy

There are two different ways to specify the MRB rules for abnormality. One is by a visual entry mode. This mode allows simple entry of the most common types of rules. It will not be possible to enter very strange or unusual rules in this mode. It is geared for the common user. The second method is by scripting in a programming language. In this mode, one can enter rules of almost arbitrary complexity. This mode is geared for the power-user.

ii. Visual Entry

An embodiment of the visual mode entry screen is shown in FIG. 10. The screen contains 12 icons arranged in a matrix of 3×4. The user types the product name at the top in the text box. Wild cards are allowed as in the rules above. Clicking an icon selects "Spatial Clustering", "Partial Test", "Statistical Bin Limits", "PCM Rules", "Lot Type Rules", "Metrology Rules", "Defect Inspection Rules", "FDC Tag Rules", "Yield Rules", "Scribe CV Rules", "Abnormal Processing Rules", and "Exit Configuration" (icons identified from upper left to lower right). A dark gray icon with sunken relief indicates that rule is already set for the product(s) listed in the text box. A light gray, raised icon indicates the rule is not yet defined for the product(s) listed in the text box, as illustrated in FIG. 10.

Spatial Clustering

If the user selects the spatial clustering icon, another menu window will open allowing further rule specification. There are five check box options to select:

Assymetric Clustering. Clicking this box will turn asymmetric clustering on. This algorithm is very similar to FSDA. PE group has a template which implements these type of clustering very quickly.

Scratch Clustering. Clicking this box will turn scratch clustering on. PE group has a template which implements these types of clustering very quickly.

Reticle Clustering. Clicking this box turns on clustering for within die clustering (i.e. dies within shots have lower yield due to litho effects). PE group has a template which implements these types of clustering very quickly.

Bin Priorities. This is 10 rows of widgets. Each row contains a check box, a text entry widget, and a list box widget. Selecting the check box applies the rules specified in each row. In the text entry widget, the user identifies the bins that the row is associated with. The bins may be listed as a comma separated entry. Additionally, "else" may be entered which indicates bins which are not defined in any of the other rows. The last widget is a list box which selects a priority from 1-5. 1 is highest priority and five is the lowest priority. This allows the user to put greater emphasis on spatial patterns on certain bins compared to others.

Sensitivity. This is a slider widget that goes from 1 to 5. It identifies how sensitive to make the spatial clustering. 1 means extremely sensitivity. 5 means extremely insensitive.

An exit button at the bottom returns to the previous icon selection screen. The user should be given a choice to save changes or discard.

Partial Testing

Selecting this icon brings up an additional menu. The menu has two rows. Each row is composed of a check box and a slider widget. Only one row can be checked at a time. The top row shows a check box with the word "% missing" next to it and a slider to the right. The slider goes from 0% to 100%. This widget selects how much of the wafer must be untested before it is triggered as an abnormal lot.

The second row shows a check box with the word "die untested" next to it. The slider goes from 0 to 100 This widget select how many die per wafer untested are needed before the lot is triggered as an abnormal lot.

An exit button at the bottom returns to the previous icon selection screen. The user should be given a choice to save changes or discard.

Statistical Bin Limits

Selecting this icon brings up an additional menu. It contains a list box widget with several options. The list items are "binomial test", "1σ", "2σ", "3σ", "6σ". If "binomial test" is selected, bins which have a yield loss outside of the binomial confidence interval will trigger an abnormal lot. If "1σ", "2σ", "3σ", or "6σ" is selected, bins which have a yield loss outside the 1, 2, 3, or 6 sigma limits based on 6 weeks of historical data for the product will be triggered as abnormal.

An exit button at the bottom returns to the previous icon selection screen. The user should be given a choice to save changes or discard.

PCM Limits

Selecting this icon opens up another menu. It consists of a 10 rows of widgets followed by a three button widgets at the bottom. The three buttons are "add PCM item", 'delete PCM item", and "Exit". Selecting the "add PCM item" adds one more row to the bottom. Selecting "delete PCM item" deletes one row from the bottom. The exit button returns to the previous icon selection screen. The user should be given a choice to save changes or discard.

Each row contains three widgets. The first widget is a checkbox widget. Selecting that checkbox indicates the row will be applied for selecting if a lot is abnormal or not. The next item is a list box widget. The list box selections are "1pt", "2pt", "3pt", "4pt", "5pt", and "mean". If "1pt" is selected this means if any of the measured site values on the PCM data are outside of the bounds specified, the whole lot should be considered abnormal. If "2pt" is selected this means if two points or more of the measured site values of the PCM data are outside of the bounds specified, the whole lot should be considered abnormal. Similarly for "3pt", "4pt", and "5pt". For "mean", it means that if the average value of any of the wafers for the selected PCM data are outside of the bounds specified, the whole lot should be considered abnormal. The next item is a text box which allows the user to input which PCM parameter the rule is based upon. This parameter should match the entry that is stored in the database. For example, IDRNW50L01 or M1RSH or COXW100L100. The next item is a list box whose selections are ">", "<", ">=", "<=", "=", and "!=" which is the comparison that should be applied to the PCM parameter selected. The final item is a text box which allows the user to select the value of comparison. Thus, if the user selects "1pt", "IDRNW50L01", ">", "500", it means that if any wafer has at least 1 PCM measurement for IDRNW50L01 which is greater than 500, the whole lot should be labeled as abnormal.

Lot Type

Selecting this icon bring up a separate menu screen. It consists of a 10 rows of widgets followed by a three button widgets at the bottom. The three buttons are "add Lot Type", "delete Lot Type", and "Exit". Selecting the "add Lot Type" adds one more row to the bottom. Selecting "Delete Lot Type" deletes one row from the bottom. The exit button returns to the previous icon selection screen. The user should be given a choice to save changes or discard.

Each row consists of a single text box widget. Inside each text box, the user will input the lot type which will trigger an abnormal lot. For example, if the user inputs "LS" than any lot which has a lot type in the database of "LS" will be labeled as abnormal.

Metrology Rules

Metrology rules are the same as PCM expect it specifies rules for metrology/inline data as opposed to PCM.

Defect Inspection Rule

This is the same as PCM rule items above except instead of "1pt", "2pt", "3pt", "4pt", "5pt", and "defect density", the only choice is "count". It may be needed to separate by class.

FDC Rules

This is the same as PCM rule items above except instead of "1pt", "2pt", "3pt", "4pt", "5pt", and "mean", the only choice is "tag count". Essentially, this identifies how many FDC tags per wafer must be incurred before the lot is deemed abnormal.

Yield Rules

Yield rules contains two widgets. A list box widget allows the user to select ">", "<", ">=", "<=", "=", and "!=" which is the comparison metric to use. The second widget is a text box widget which allows a user to input the yield value. Alternatively, the user can input 1s, 2s, 3s, etc where 's' means sigma. In this cases, sigma is calculated on the last 6 weeks of yield data.

SCV Rules

This is exactly the same as PCM rules except the user inputs SCV parameter names instead of PCM parameter names.

Abnormal Processing Rule

If the user selects this icon than any abnormal comment or item input into the MES system for that lot by the operator will automatically trigger the lot to be abnormal.

Exit

Selecting this icon exits the menu and returns to the previous screen.

iii. Scripting

A scripting language allows the user to input rules of arbitrary complexity. This might be "R" or "Python" or similar scripting language which allows user to input rules of arbitrary complexity. In this scripting language, variables and objects will be pre-defined to allow the user to refer and use the objects. For example (in a pseudo-code type format):

```
Product = 2SK75*
{
  Spatial.Assymetry.Wafer = TRUE
, Spatial.Scratch.Wafer = TRUE
  Spatial.Shot.Wafer = TRUE
  Spatial.Bin.Priority = (0,5), (4,4), (else,3)
  Spatial.Bin.Delta = (*,5%)
  SBL.Wafer.Bin = (0, Binomial), (1, 3s), (2, 6s)
  PCM.Water.3pt.IDRNWL5.00/0.100 < 235
.
```

In this example, rules are defined for product with a name beginning with 2SK75. Spatial.Assymetry.Wafer=TRUE means that in the spatial clustering module, the option for assymetrical clustering is turned on.

iv. Forking Off an MRB Run Manually

At the bottom of the "Visual Entry" menu is a button which says "TEST RULES". If that button is selected, the rules for the selected product will be run immediately and a drill down result will be generated.

E. Drilldown Results i. Control Page

Figure 11:
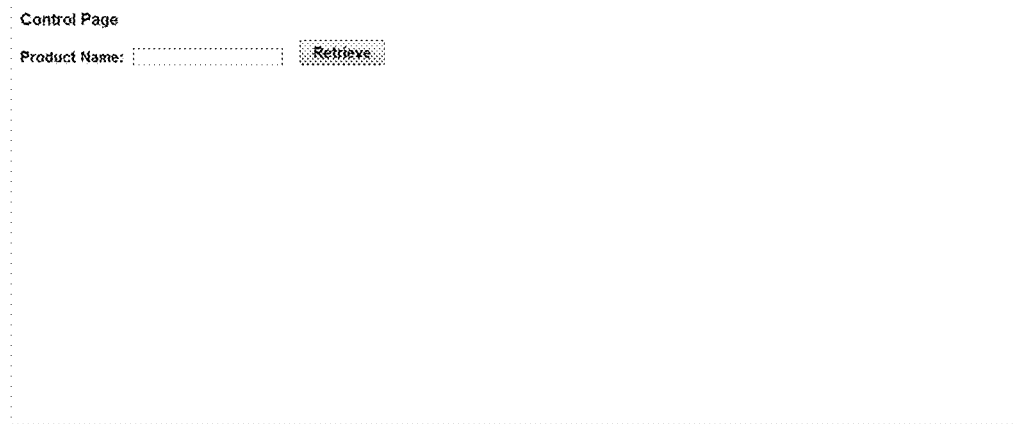
FIG. 11 illustrates a control page associated with the manufacturing rule board component of the manufacturing insight system.

This tab allows you to input the product name (wild cards allowed) and hit "retrieve" as shown In FIG. 11. After hitting retrieve, the last 50 or so runs against the product will be displayed. The user can then select the button next to the run of interest and the results will be retrieved from the database.

ii. Abnormal Overview

Figure 12:
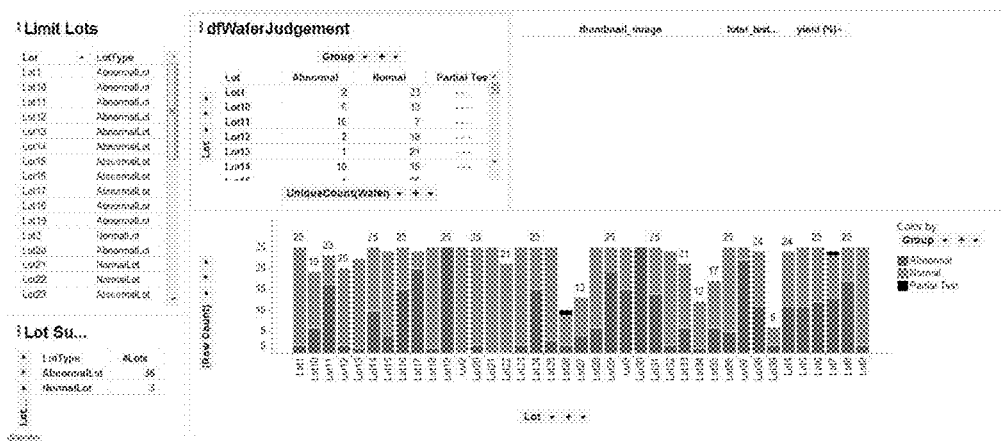
FIG. 12 illustrates an abnormal overview associated with the manufacturing rule board component of the manufacturing insight system.

This tab shows each lot and how many wafers in each lot are normal vs abnormal as shown in FIG. 12. If you click on one of the lots, the next tab will show the reasons for abnormaility.

iii. Wafer Summary

Figures 13, 14:
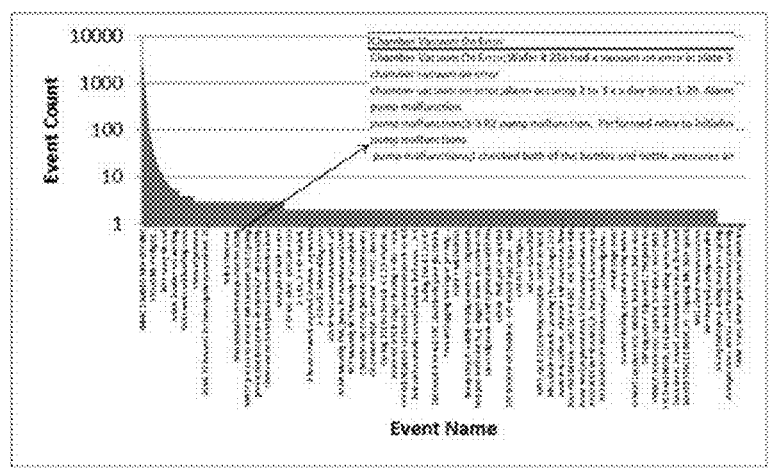
FIG. 13 illustrates a wafer overview associated with the manufacturing rule board component of the manufacturing insight system.
FIG. 14 shows a partial example of data for a particular tool that is associated with the manufacturing insight system.

This tab shows a table on the left and wafermap on the right as shown in FIG. 13. In the table, the columns are all of the rules that were applied against the lot. a "NO" means the wafer is normal for that rule. A "YES" means the wafer is abnormal against the rule. If a cell is selected, a wafermap for that lot for that rule is shown on the right. There are two wafermaps. The top wafermap is the stacked wafermap for the lot and the wafermap below is the wafermap for just that selected wafer ("cell" in the table). In case the rule is not wafermap related (e.g. lot type rule from above) no wafermap should be shown.

Efficiency

The efficiency module utilizes a number of different components. These include but are not limited to:
(1) A PM Optimizer that monitors all equipment and determines an optimal time to do PM (Preventative maintenance) to prevent tool trouble.
(2) A Throughput Optimizer correlates hourly indicators and determines relationships between FDC indicators and equipment throughput.
(3) An Event Analyzer analyzes the impact of consumable events on yield or equipment throughput
(4) A Breakage Analysis Engine analyzes breakage frequency and correlates FDC data.
(5) A Recipe Mixing Analysis engine analyzes the impact of recipe mixing on yield.

Definitions for Throughput are noted, as they are significant with respect to Efficiency determinations.

| Definition | Meaning |
| --- | --- |
| Production Time | The time the tool is actually processing a wafer. |
| PM Time | The time the tool is down for maintenance or consumable changes (scheduled down time) |
| Down Time | Unscheduled down time (e.g. tool broke during processing and needs repair) |
| Lot-to-Lot Idle Time | Idle time between lots due to no lot waiting or waferless-auto-clean, etc. |
| Wafer-to-wafer Idle Time | Idle time between wafer processing due to wafer movement, etc. |

Other definitions can be defined (e.g. E10 efficiency metrics) but the above would be default.

A. Efficiency to Indicator Calculation

Once efficiency has been defined, it can then be correlated to other explanatory variables. A useful variable is daily (or hourly) indicators. During a particular day (or hour) and for a particular sensor on the equipment (e.g. pressure, temperature, mass-flow, etc.), the entire trace is summarized by a single statistics including but not limited to median, average, min, max, standard deviation, etc.

Then the efficiency values on a particular day (or hour) are correlated to the daily (hourly) indicators. A strong correlation indicates that a tool's throughput is strongly determined by a particular sensor on the tool. As such, the user can then optimize that parameter of the tool to get more through-put.

Of course, heuristical grading and learning as mentioned above are used with this data to maximize true signals and minimize false signals.

B. PM, Consumable and Event Analysis

For PM, Consumable, and Event Analysis, it often involves using text data as an input data. Text data is very challenging to work with because it has human qualities misspellings, different word choices, different languages, etc. FIG. 14 shows a partial example for a particular tool and during three months of data all of the text data that can be logged: Thousands of events are present. As the inset shows many of the text are similar but not identical because of mis-spellings and concatenating of sentences. A sophisticated approach is needed in analyzing, as illustrated in FIG. 15.

Figure 15:
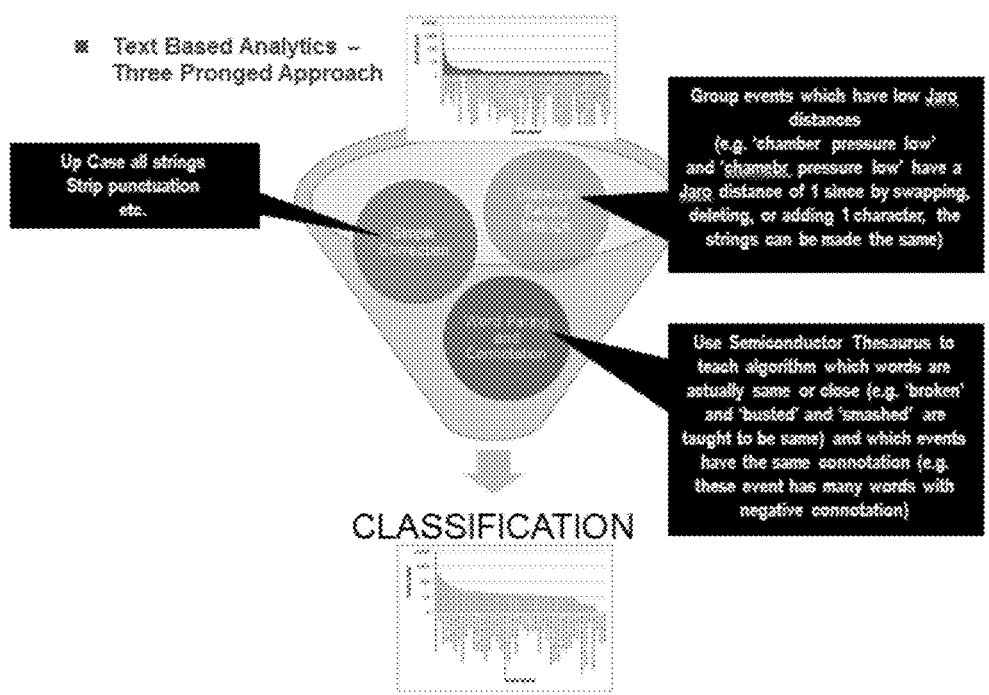
FIG. 15 illustrates an analysis approach used within the manufacturing insight system.

The three pronged analysis approach illustrated in FIG. 15 is premised on the following. First, simple correction is done to the text such as up casing all strings, stripping punctuation, etc. Then, the Jaro-Winkler or similar distance metric is calculated between each text string. Jaro-Winkler and similar algorithms are used to express the number of swaps or insertions or deletions that are required to make two strings identical. For example "chamber pressure low" and "chamber pressure low" have a distance of one since by swapping the position of two of the letters in a string, they can be made equal. In this way, strings which have low Jaro distance to other strings (e.g. one or two) are merged together as they are considered the same. However, one has to be careful in implementing this method. Certain words need to be protected from Jaro-Winkler comparison because even though the distance is small, the meaning is totally different. For example, "CR1 pressure failure" and "CR2 pressure failure" have a Jaro distance of one but they should definitely not be merged as in this ease, CR1 and CR2 are two different chamber names. Finally, the third prong of the attack is Word Pairing and connotation. In this method, a thesaurus (which hopefully also includes semiconductor words) is used to teach which words are actually same or close (e.g. 'broken' and 'busted' and 'smashed' are taught to be same) and which events have the same connotation (e.g. "pressure low", "cannot strike plasma", "maintenance failed" are all strings which contain negative connotation and they might be grouped together.

Figure 16:
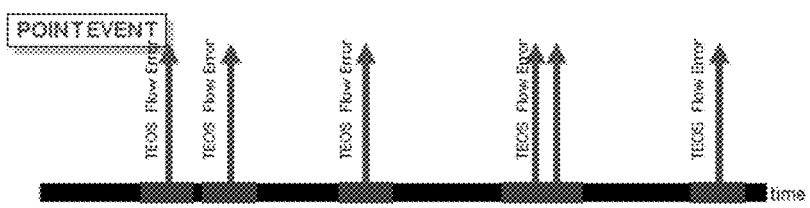
FIG. 16 illustrates point event analysis used within the manufacturing insight system.
Figure 17:
FIG. 17 illustrates cyclical event analysis used within the manufacturing insight system.

Once events have been reduced to a manageable level, the analysis continues. Basically, there are two types of events: point events and cyclical events. Point events are events which occur with non-predictable or irregular occurrence in time. Cyclical events are events which occur with relative regularity (e.g. maintenance events). FIGS. 16 and 17 illustrate these two types: point events and cyclical events, respectively.

For point events and cyclical events, the analysis method is different. For point events, we want to compare the response variable near the point event vs outside the point event. Since "near" and "outside" are relative terms the analysis often has to be done over varying event horizons to find the strongest correlation (e.g. vary the event horizon across a wide range and compute heuristic grades and report back signals with the highest grades).

Figure 18:
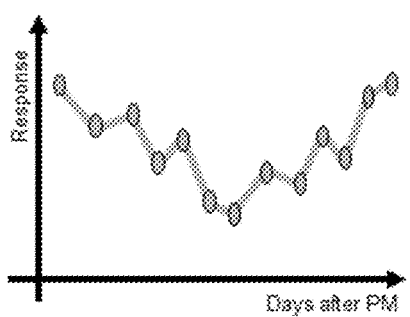
FIG. 18 illustrates cyclical event correlations from the manufacturing insight system.
Figure 18:
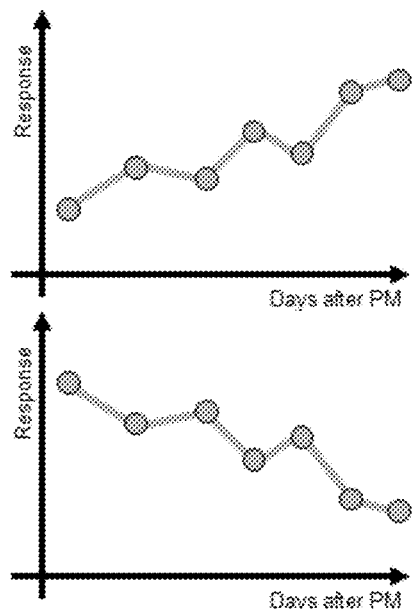

For cyclical events, we want to stack all of the data and plot the response as a function of time after (or before) the nearest cyclical event. As shown in FIG. 18, several different correlations need to be tested: increasing after event, decreasing after event, and bath-tub curves after event.

For each type of correlations, heuristical grades need to be computed as discussed above and the signals with the best grades are presented to the user for learning application.

C. Breakage Analysis

Breakage analysis is an extension of event analysis. In this case, the event is a wafer broken. As such, we want to look at the response as a function of number of wafers before the broken one and number of wafers after the broken wafer. We might desire to compute the graph for all tools/tool types in the factory and determine which tools have the highest grade signals. In that case, more efficient scrapping criteria can be developed which ultimately improves the yield.

D. Recipe Mixing

In recipe mixing, the goal is to correlate the response as a function of the number of recipes (or recipe type such as via etch vs trench etch) for each tool type. For correlations with a significant grade, the signal is presented to the user as part of the learning process.

Variability Reduction

The last of the modules implemented identify variability reduction. Sources of variability using available data and provide auto-drill-down for root cause and improvement with supporting/contradictory evidence, based on the data.

Modules noted above in the Yield section are also used for variability reduction, including the LEH/WEH module, the Scribe CV module, the Device module, the Spatial Clustering Module. In addition, and Inline module that provides a conjoined equipment history, FDC, inline parameter analysis and auto-drill down is provided.

Although the present disclosure has been particularly described with reference to the preferred embodiments thereof, it should be readily apparent to those of ordinary skill in the art that changes and modifications in the form and details may be made without departing from the spirit and scope of the disclosure. It is intended that the appended claims encompass such changes and modifications.

What is claimed is:

1. A method of reducing multitudes of input data signals to a manageable plurality of input data signals using a computer system and user feedback, comprising the steps of:
    inputting each of the multitudes of input data signals to the computer system;
    determining which of the multitudes of input data signals are heuristically significant input data signals using the computer system and a grading system that includes heuristical and/or statistical information;
    further reducing the multitudes of input data signals to the manageable plurality of input data signals using the computer system and the heuristically significant input data signals via the computer system monitoring passive and active user feedback; and
    using the manageable plurality of input data signals to obtain response data, wherein the input data signals are a subset of machine-readable entry sourced from a semiconductor wafer, packaging, or design facility, and wherein the response data is associated with the semiconductor wafer, the packaging, or the design facility.

2. The method according to claim 1 wherein the grading system includes weights for each of the following with respect to certain ones of the input signals:
    strength of a correlation;
    consistent slope across each of a plurality of tools, where each of the plurality of tools are electronic equipment electrically coupled to the computer system;
    consistent slope across time; correlation of multiple variables with respect to the certain ones of the input signals; and
any other derived indicator of the input signal.

3. The method according to claim 2 wherein each of the weights are combined to provide the grading system.

4. The method according to claim 1 wherein determining actively significant input signals further includes differentiating user feedback between levels of positive and negative feedback, and asymmetrically assigning weights such that positive feedback is more heavily weighted than negative feedback.

5. The method according to claim 4 wherein the feedback from certain users are filtered.

6. The method according to claim 5 wherein a plurality of feedback occurrences that occur within a predetermined period of time are reduced to fewer occurrences.

7. The method according to claim 6 wherein determining actively significant input signals further includes volatility differentiation of user feedback between recently occurring user feedback and selectively aged user feedback.

8. The method according to claim 7 wherein the volatility and feedback differentiation is linearly weighted.

9. The method according to claim 7 wherein the volatility and feedback differentiation is non-linearly weighted.

10. The method according to claim 1 wherein the input data is summarized equipment fault detection and classification data and the response is yield.

11. The method according to claim 1 wherein the input data is summarized equipment fault detection and classification data from any process step(s) in either wafer or packaging areas, and the response is test chip parametric or yield data.

12. The method according to claim 1 wherein the input data and response data is a subset of a manufacturing execution system, in-line metrology, consumable, environmental, maintenance log or schedule, process characterization, wafer acceptance test, scribe, product bin, product parametric test, product yield, packaging, or non-lot data.

* * * * *